Patented June 8, 1954

2,680,690

UNITED STATES PATENT OFFICE 2,680,690

LIQUID PEPPER COMPOSITION AND PROCESS FOR PRODUCING THE SAME

Frederick R. Schumm, Jersey City, N. J., and Claude Johnstone, Hicksville, N. Y., assignors to Dodge & Olcott, Inc., New York, N. Y., a corporation of Delaware No Drawing. Application May 2, 1952,
Serial No. 285,798

9 Claims. (Cl. 99—140)

This invention relates to solubilized pepper compositions derived from the oleoresin of members of the Piperaceae family, and provides liquid piperin compositions especially useful for the seasoning of foods and also an improved method by which these compositions may, with advantage, be prepared.

Oleoresins derived from the plant, *Piper nigrum* L., i. e., black pepper, and from other members of the Piperaceae family, contain a considerable amount of piperin, an ingredient responsible for much of the bite and pungency characteristics of pepper and of the oleoresins made from plants of this family. However, commercial oleoresins of this type are non-homogeneous products, consisting primarily of essential and fixed oils as a liquid phase, and a solid phase consisting essentially of piperin. The relative insolubility of the piperin results in a slow taste-perception of its pepper-like qualities.

The primary commercial use of the oleoresins of pepper is in the manufacture of food seasoning compositions. For this purpose, the insolubility of the piperin has been found objectionable and has mitigated against their use as such and the ready, economical production therefrom of other uniform seasoning compositions.

In our copending application Serial No. 193,536, filed November 1, 1950, now Patent No. 2,626,218 issued January 20, 1953, we have described and claimed a homogeneous liquid pepper composition, and a process for producing such composition which comprises mixing with an oleoresin of pepper a substantially anhydrous, normally liquid organic acid, which is miscible with the essential oils of the oleoresin.

The process of said copending application has been used with marked success. Its use is, however, subject to the disadvantage that many of the organic acids which are miscible with the essential oils of the oleoresins, and particularly those which have gained acceptance as ingredients of food for human consumption, possess characteristic tastes or odors and tend to alter somewhat the natural pepper taste, or aroma. This is particularly true of acetic acid and butyric acid. On the other hand, levulinic acid, which is entirely free from these objections, and also pyruvic acid, are not readily obtainable in the present day market.

We have now discovered that anhydrous lactic acid, which has long been accepted as a constituent of food for human consumption, may be used, with advantage, in producing solubilized pepper compositions from the oleoresins of pepper.

Like levulinic acid, anhydrous lactic acid, is substantially free from objectionable taste and odor, and also has the properties of solubilizing the solid phase of commercial oleoresins, consisting essentially of piperin. Unlike levulinic acid, lactic acid is readily available but is not soluble in, or miscible with, the essential oils of the oleoresins to any substantial extent and, therefore, does not form a stable homogeneous liquid phase when mixed with the oleoresins.

We have found, however, that where substantially anhydrous lactic acid is mixed with an oleoresin of pepper, not only is the piperin solubilized, but also there is produced a thick, viscous mixture of the solubilized piperin and the oil constituents of the oleoresin of the nature of an emulsion. On warming, this mixture becomes more fluid and separates into two liquid layers. But, at normal temperatures, the mixture is very slow to separate, and when well mixed, separates so slowly at normal temperatures as to permit the withdrawal of a uniform composition from the container over extended periods of time. At low or moderate temperatures, the mixture possesses many of the advantages of the homogeneous liquid pepper composition prepared by mixing levulinic acid with the oleoresin.

Predicated upon this discovery, our present invention comprises the mixing of anhydrous lactic acid with an oleoresin of pepper, for instance, a commercial oleoresin, or an equivalent composition, such as extracted from pepper corns, in accordance with conventional procedure. The mixing of these materials is advantageously carried out at room temperature.

The lactic acid used in accordance with our present invention, must be substantially anhydrous and is, with advantage, prepared from U. S. P. grade lactic acid, which consists essentially of a mixture of lactic acid and lactic anhydride, the former constituting 85% to 90% of the mixture. This anhydrous lactic acid may be prepared, for instance, by heating 85% U. S. P. lactic acid, at atmospheric pressure, until 15% by weight of water has been distilled off, or until the temperature of the boiling liquid reaches 140° C. Some lactic anhydride is usually formed during the dehydration of lactic acid and such mixtures are included by the term anhydrous lactic acid, as used herein.

The proportion of the lactic acid to oleoresin may be varied within the range of about one part to about three parts of the anhydrous lactic acid, for each three parts of oleoresin by weight. The use of about one part of the acid for each two parts of the oleoresin has been found to give generally satisfactory results. We have found, however, that where less than about one part of acid for each three parts of oleoresin is used, the piperin is likely to be precipitated from solution if subjected to low temperatures, such as frequently encountered in winter weather. We have further found that, while in excess of one part of the acid per part of the oleoresin may be used effectively, no additional advantage is usually gained by so doing and greater proportions of the acid are not generally desirable since they serve to dilute the flavoring principles of the mixture.

Where desired, these novel pepper compositions of our present invention may be used, as such, or may be further processed to stable, uniform, seasoning compositions in powder form. Also, the use of proportions of the lactic acid without the indicated range, but effective to promote solubility of the piperin, is contemplated by the broader aspect of this invention.

For the purposes of our invention, the oleoresins of pepper, as previously indicated, may be prepared by conventional procedure. Such procedure usually consists in the extraction of dry, ground pepper corns by a volatile solvent such as ether, alcohol, acetone, methylene chloride, chloroform, hexane, heptane, or the like. Following the extraction, the solvent is usually removed by distillation at moderate temperatures, the resultant residue constituting the oleoresin of the pepper. This product, as previously stated, is composed of a solid phase, constituting the piperin and natural resins, and a liquid phase consisting of fixed and essential oils. Upon standing, the solid phase will form a hard, crystalline mass which frequently must be heated to its softening point before ready removal from its container is possible. Such heating must be carefully controlled as any overheating deleteriously affects the odor of the pepper composition. By our present invention, the normally solid piperin is solubilized so that such previously experienced difficulties are avoided.

The invention will be more particularly described and illustrated by the following specific example of its application to black pepper compositions. It will be understood, however, that the invention is similarly applicable to other members of the Piperaceae family.

Four thousand pounds of black pepper corns are dried, ground to 20 mesh size and extracted with acetone in the conventional type of continuous extraction apparatus until the extraction of the oleoresin is complete. The resultant extract is then distilled at atmospheric pressure to remove the major portion of the solvent, the distillation being continued until the residual liquid reaches a temperature of about 150° F. This residual liquid is then cooled to about room temperature and 200 pounds of anhydrous lactic acid is added thereto. The distilling vessel is then closed and the distillation continued with agitation, at an absolute pressure of about 1 pound per square inch, until the last of the solvent is distilled off. In this distillation operation, the temperature of the liquid is not permitted to exceed 150° F.

It will be understood that, in place of acetone, other volatile solvents for the oleoresins, such as previously mentioned herein, may be used and the temperature used in distilling off the solvents will be dictated largely by the boiling point of the particular solvent selected. Temperatures at which substantial decomposition of the oleoresin is effected should, of course, be avoided.

Upon cooling and agitating, a thick viscous emulsion, composed of solubilized piperin and the oil constituent of the oleoresin, of the type previously described herein, is produced.

In the foregoing example, the anhydrous lactic acid was added to the oleoresin while the latter still contained a small amount of the extractive solvent. We have found that the presence of a small amount of the solvent is advantageous as it facilitates the mixing of the lactic acid with the oleoresin. It is understood, however, that the presence of the solvent is not essential to our present process, and when the solvent is not present, the subsequent heating at reduced pressure will, of course, be unnecessary. Where desired, ordinary oleoresins of commerce, free from extractive solvents, may be used as the starting material.

Where the subsequent distillation, at reduced pressure, is employed to remove residual extractive solvent, excessive temperatures should be avoided so as to preserve the natural taste and aroma of the pepper.

We claim:

1. The process for producing liquid pepper compositions which comprises adding to, and mixing with, an oleoresin of pepper, anhydrous lactic acid in an amount effective to solubilize the piperin.

2. The process of producing liquid pepper compositions which comprises adding to, and mixing with, an oleoresin of pepper, in the presence of a relatively small proportion of an organic solvent, substantially anhydrous lactic acid in an amount effective to solubilize the piperin and distilling off the organic solvent at reduced pressure.

3. The process for producing liquid pepper compositions which comprises adding to, and mixing with, an oleoresin of pepper, anhydrous lactic acid, the proportion of the lactic acid to the oleoresin used being not less than about 1:3, by weight.

4. The process for producing liquid pepper composition which comprises adding to, and mixing with, an oleoresin of pepper, anhydrous lactic acid, the proportion of lactic acid used being within the range of 1 to 3 parts of the acid for each 3 parts of the oleoresin, by weight.

5. Process for producing liquid pepper compositions which comprises adding to, and mixing with, an oleoresin of pepper, anhydrous lactic acid, the proportion of lactic acid to the oleoresin used being about 1:2, by weight.

6. A pepper composition comprising piperin solubilized in substantially anhydrous lactic acid.

7. A thick, viscous liquid pepper composition consisting essentially of solubilized piperin, the oils normally present in oleoresins of pepper and substantially anhydrous lactic acid.

8. A thick, viscous liquid pepper composition consisting essentially of solubilized piperin, the oils normally present in oleoresins of pepper and substantially anhydrous lactic acid, the proportion of lactic acid being within the range of 1 to 3 parts of the acid to each 3 parts of the other two named constituents, by weight.

9. A thick, viscous liquid pepper composition consisting essentially of solubilized piperin, the oils normally present in oleoresins of pepper and substantially anhydrous lactic acid, the proportion of lactic acid being about half the summation of the weight of the other two named constituents.

References Cited in the file of this patent

UNITED STATES PATENTS

| Number | Name | Date |
| --- | --- | --- |
| 1,602,183 | Thomssen | Oct. 5, 1926 |
| 2,079,415 | Levinson | May 4, 1937 |